July 14, 1964 R. F. ADAMS Re. 25,619

HEAT EXCHANGER

Original Filed June 16, 1955 2 Sheets-Sheet 1

INVENTOR
RICHARD F. ADAMS
By Pennie and Sutherland
ATTORNEYS.

July 14, 1964

R. F. ADAMS

HEAT EXCHANGER

Re. 25,619

Original Filed June 16, 1955

2 Sheets-Sheet 2

INVENTOR:
RICHARD F. ADAMS
By Brumiga and Sutherland
ATTORNEYS.

United States Patent Office

Re. 25,619
Reissued July 14, 1964

25,619
HEAT EXCHANGER

Richard F. Adams, Schenectady, N.Y., assignor to Olin Mathieson Chemical Corporation, East Alton, Ill., a corporation of Virginia Original No. 2,856,164, dated Oct. 14, 1958, Ser. No. 515,857, June 16, 1955. Application for reissue Sept. 12, 1960, Ser. No. 55,611
12 Claims. (Cl. 165—148)

Matter enclosed in heavy brackets [ ] appears in the original patent but forms no part of this reissue specification; matter printed in italics indicates the additions made by reissue.

This invention relates to heat exchange devices, particularly those of the type which are produced from a plate composed of a pair of metallic sheets pressure welded together about an intervening pattern of stop-weld material, and wherein the pattern of stop-weld material is distended by inflation to provide tubular passageways for heat exchange media.

In the copending application of John D. Wilkins, Serial No. 495,542, filed March 21, 1955, *now U.S. Letters Patent No. 2,924,437 granted February 9, 1960,* there is disclosed a heat exchange device of the general character aforesaid wherein the plate containing the tubular passageways is zig-zag folded in order to crowd a greater multiplicity of such tubular passageways into a compact structure having a relatively small frontal area, but nevertheless providing access for the circulation of heat transfer media about the exteriors of the several tubes.

Other efforts have been made to design a heat exchange device utilizing a plate of the character aforesaid, but difficulties have been encountered in providing such a structure wherein a header interconnecting the several tubes was provided as an integral part of the pressure unified plate. While the interconnecting header may be readily incorporated in the pattern of stop-weld material, and produced in the same manner in the same flat plate as the individual tubes, the difficulties arise when the plate is bent or folded so as to expose the minimum area of the tubes athwart the stream of external heat transfer medium, and to present the maximum area of such tubes parallel with the flow of such medium. The bending or folding of such a plate, in order to present the tubes in the optimum relationship of the flow of external heat transfer medium, has heretofore involved concomitant folding of any integral interconnecting header, and it is the object of the present invention, generally stated, to provide such a heat exchange device and a method of making the same whereby the tubes themselves may be bent and folded to secure the optimum relationship of their exterior surfaces in the stream of external heat exchange medium without distorting or obstructing the integral interconnecting header.

Other objects will become apparent to those skilled in the art when the following description is read in connection with the accompanying drawings, in which.

The present invention makes use of a pressure unified plate composed of two metallic sheets pressure welded together about an intervening pattern of stop-weld material, which pattern defines the location of unbonded areas within the plate, and which bonded areas may be distended by inflation to produce tubular passageways. The manner of producing such a plate is fully disclosed in the aforesaid application of John D. Wilkins. In said Wilkins application, the pressure unified plate, as originally produced and inflated, includes both unbonded areas which define the tubes, and unbonded areas which define interconnecting headers between the tubes. In accordance with the Wilkins application, however, the interconnecting headers are utilized only for the purpose of inflating the several tubes, and are thereafter cut away so that, in the resultant heat exchange element, the ends of the tubes are open at the edges of the inflated and folded plate; hence it is necessary to provide a separate header device which interconnects the several tubes at the tops and bottoms thereof.

In accordance with the present invention, however, the unbonded area which defines the header within the pressure unified plate remains as a part of the completed device, and preferably remains flat during the deformation of the portions of the plate which embrace the several tubes. In order to accomplish this, the present invention contemplates that the portions of the plate which embrace the tubes be twisted so that the parts thereof intermediate their junctions with the headers extend in a direction substantially perpendicular to the plane of the plate and the plane in which the headers extend. In order to twist the several tubes in the manner just described, the bonded area of the plate between the several tubes is discontinuously slit in the direction of the tubes so as to leave relatively short interconnecting tabs between neighboring tubes. Such tabs are determined by the discontinuities in the slits above mentioned, and in order to accomplish the preferred result, the discontinuities in adjacent slits are staggered. This enables the intermediate portions of the respective tubes to be twisted and zig-zag folded so that the tabs between one tube and its neighbor on one side are not only disaligned with the interconnecting tabs between the first tube and its neighbor on the other side, but that the two sets of tabs extending from a given tube are at the front thereof on one side, and at the rear thereof on the other side. The twisting and folding of the tubes as aforesaid results in a generally sinuous bending of each individual tube, and provides between each tube and its neighbors a series of substantially diamond-shaped openings (where the slits originally existed) for the access of external heat transfer medium.

Figure 1:
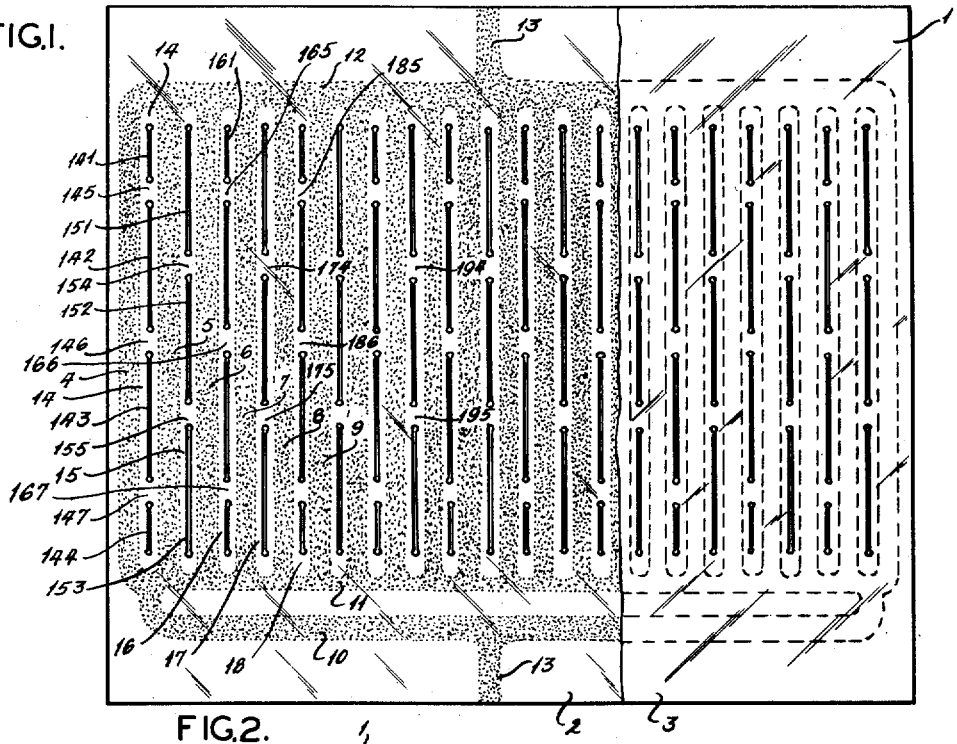
FIGURE 1 is a plan view of a flat plate composed of a pair of metallic sheets pressure unified about a pattern of stop-weld material, the upper half of the thickness of said plate being in part torn away to reveal the location of the bonded and unbonded areas between the upper and lower halves (thickness-wise) of the plate.
Figure 2:
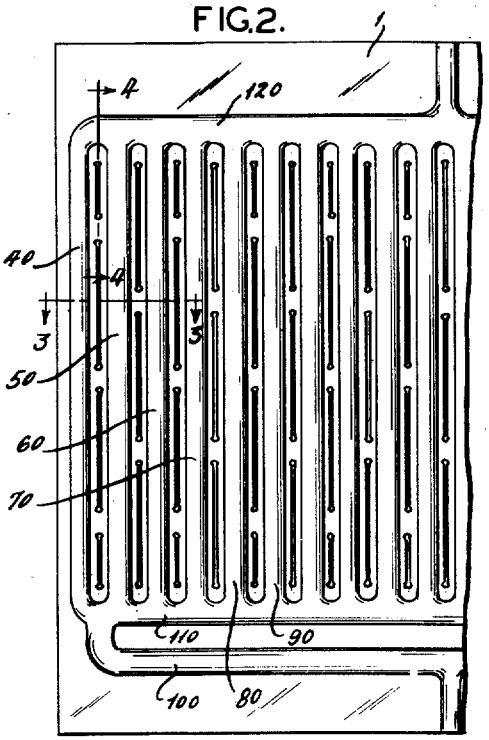
FIGURE 2 is a partial plan view of the plate shown in FIGURE 1 after the unbonded areas thereof have been distended by inflation.

Referring now to the drawings for an illustrative embodiment of the invention, it will be observed that the plate 1, shown in FIGURE 1, consists of sheets 2 and 3 which are pressure welded together about a pattern of stop-weld material, consisting in the embodiment shown, of a series of vertically elongated tube defining areas such as 4, 5, 6, 7, 8, and 9, as well as transversely elongated interconnecting header defining areas 10, 11, and 12. Between the elongated areas 4 and 5, there exists an area 14 wherein the sheets 2 and 3 are bonded together. Similar bonded areas exist between 5 and 6, between 6 and 7, between 7 and 8, and between 8 and 9, and are designated, respectively, 15, 16, 17, and 18. As is the usual practice in the production of such roll bonded plates, the component sheets 2 and 3 are bonded together throughout their entire area, except where the pattern of stop-weld material exists, and hence the bond extends about the entire periphery of the plate save at one or two positions such as 13, where the pattern of stop-weld material extends to the edge of the plate for the purpose of facilitating access of an inflation tool.

After the plate 1 has been produced by pressure-welding the sheets 2 and 3 about the pattern of stop-weld material, discontinuous slits are formed in the areas 14, 15, 16, 17, and 18. For example, in area 14, the discontinuous slit consists of four longitudinally aligned slits 141, 142, 143, and 144, between the adjacent ends of which there remain webs 145, 146, and 147. The even numbered bonded areas 16 and 18 are correspondingly slit. Similarly, the bonded area 15, and the other odd numbered bonded areas 17 and 19 are provided with but three slits 151, 152, and 153, between adjacent ends of which tabs 154 and 155 remain. Thus, the discontinuities of the slits in the even numbered bonded areas are in staggered relationship with the discontinuities of the slits in the odd numbered areas.

After the plate 1 has been produced and slit as above described, appropriate inflation tools are inserted between the sheets 2 and 3 at 13, and fluid pressure applied to the interior of the plate so as to distend the several areas delineated by the pattern of stop-weld material, and to produce tubes 40, 50, 60, 70, 80, and 90, where the elongated strips of stop-weld material 4, 5, 6, 7, 8, and 9 existed, as well as to produce tubes 100, 110, and 120 where the strips of stop-weld material 10, 11 and 12 existed.

Figure 3:
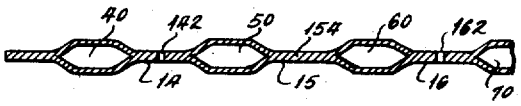
FIGURE 3 is a sectional view taken along line 3—3 of FIGURE 2.
Figure 4:
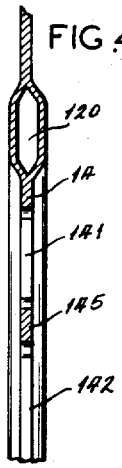
FIGURE 4 is a sectional view taken along line 4—4 of FIGURE 2.
Figure 7:
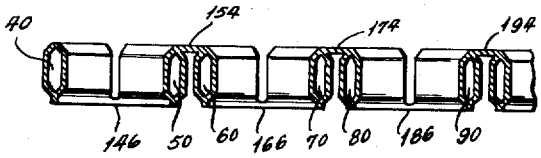
FIGURE 7 is a sectional view taken along line 7—7 of FIGURE 5.
Figure 6:
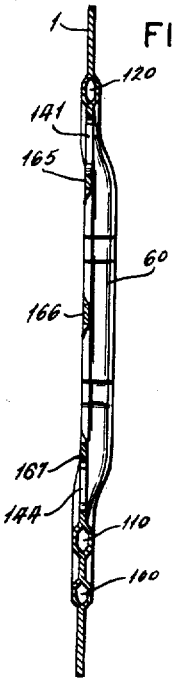
FIGURE 6 is a sectional view taken along line 6—6 of FIGURE 5.

As clearly shown in FIGURE 3, the several tubes are of oval cross-section, with the major axes extending parallel to the plane of plate 1. In order to accomplish efficient heat transfer, it is most desirable that the tubes present their minor axes athwart the flow of external heat transfer medium, and present their major axes parallel to the direction of that flow. Consequently, the invention contemplates that the several tubes 40, 50, 60, etc., be twisted so that the major axes thereof extend in a direction perpendicular to the plane of plate 1. The discontinuous slitting above described enables this to be accomplished with simultaneous sinuous bending of the several tubes, as shown clearly in FIGURE 5. The operation of twisting and bending the several tubes may be accomplished by forcing the plate upon an appropriate jig having portions which enter the centers of the several slits to stretch them transversely as they are foreshortened longitudinally and concurrently to turn the tubes about their longitudinal axes so that the intermediate portions thereof are twisted substantially 90° from their original positions, as clearly shown by the contrast between FIGURE 3 and FIGURE 7. In this operation, the tab 145 and its counterparts 165 and 185 in the even numbered bonded areas 14, 16, and 18, remain at the front while the tab 154 and its counterpart 174 and 194 in the odd numbered bonded areas 15, 17, and 19, go to the rear. Similarly, the tabs 146, 166, and 186 come to the front, while the tabs 155, 175, and 195 go to the rear so that a zig-zag folded structure is produced concurrently with the enlargement of the several slits in the production of the series of diamond-shaped openings 20 for the access of heat exchange medium traveling in a direction parallel to the major axes of the tubes; and all without bending or distorting the header tubes 100, 110, and 120 out of the plane of plate 1.

Figure 5:
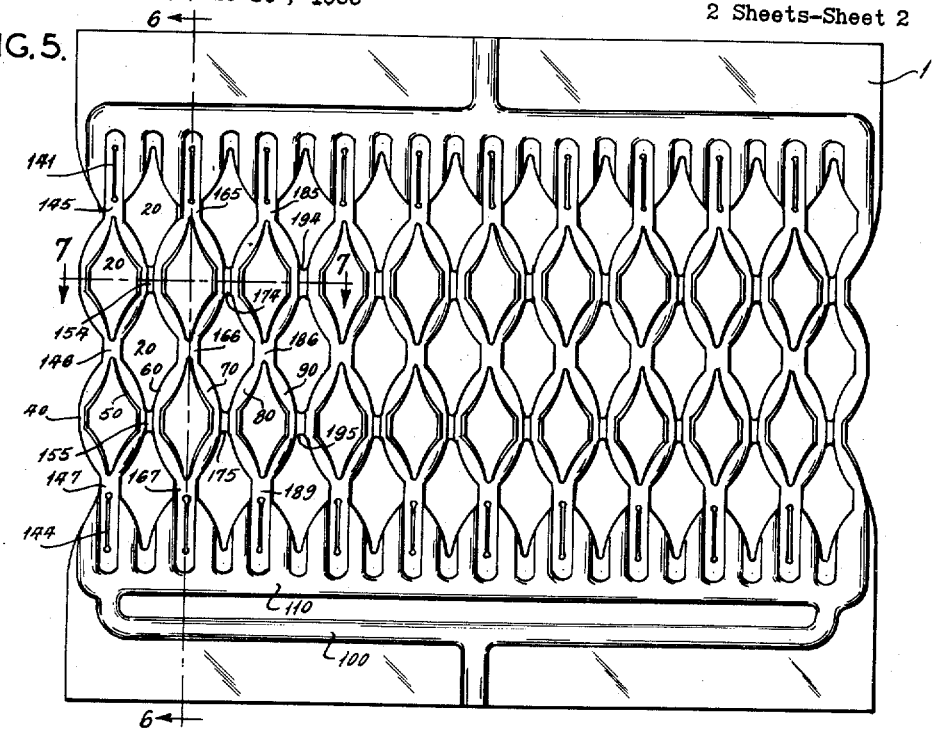
FIGURE 5 is a plan view of the heat exchange element produced in accordance with the present invention from the plate shown in FIGURE 1.

*As shown in FIGURE 5 such processing of plate 1 in accordance with this invention results in a reticulated structure of meshes or openings 20, having a configuration of that commonly known as an expanded metal structure, which has a plurality of these meshes or openings 20 in staggered relationship with each other and separated or circumscribed by strands of metal integrally connected to each other as spaced points about the openings. The connected strands upon being bent or twisted out of the plane of plate 1 form a network in the reticulated structure through which the several tubes 40, 50, 60, etc., extend within corresponding strands between and interconnected with header tubes 110 and 120.*

While the invention has been described in connection with an embodiment wherein a fold is made between each tube and its neighbor, it will be understood that the several tubes 40, 50, 60, etc., may be subdivided into smaller tubes which present a panel of aligned tubes in the location shown for the tubes 40, 50, 60, etc., in the drawings.

From the foregoing description, those skilled in the art should readily understand the invention and realize that it accomplishes its objects, and that the resultant structure achieves not only the desideratum of providing an integral unobstructed header within the pressure unified plate, but also the desideratum of positioning the several tubes so as to present the minimum obstruction to the flow of external heat exchange medium across the same, and to present the maximum area for dissipation of heat through the walls of the tubes.

While one embodiment of the invention has been described in detail, it is to be understood that the invention is not limited to the details of such description. On the contrary, it is realized that numerous modifications and variations will present themselves to those skilled in the art in the adaptation of the invention to various conditions of use, and consequently, it is to be understood that such variations and modifications as do not depart from the spirit of the invention are, although not specifically described herein, contemplated by and within the scope of the appended claims.

Having thus described the invention, what is claimed and desired to be secured by Letters Patent is:

1. A heat exchange unit of the character described comprising a pressure unified support plate having a series of interconnected tubes extending therein in generally parallel relation with the plane of said plate and including a series of tube portions in rows separated from each other angularly in side-to-side relationship, portions of said plate which embrace said tubes intermediate the ends thereof being twisted into substantially perpendicular relation with the plane of said plate, the tubes in the twisted portion being interconnected at said ends to the tubes in the untwisted portion of the plate but at least partially separated from each other intermediate said ends.

2. A heat exchange unit of the character described comprising a pressure unified plate having a series of tubes extending therein in generally parallel relation, portions of said plate which embrace said tubes intermeditae the ends thereof being twisted into substantially perpendicular relation with the plane of said plate, and integrally connected alternately front and back in spaced relationship lengthwise of said tubes.

3. A heat exchange unit of the character described comprising a pressure unified plate having a series of tubes extending therein in generally parallel relation, portions of said plate which embrace said tubes intermediate the ends thereof being twisted into substantially perpendicular relation with the plane of said plate, each tube approaching toward and receding from its neighbor alternately throughout the length thereof and integrally connected alternately to its neighbors on opposite sides thereof at the points where such tubes most closely approach each other.

4. The method of making a heat exchange unit of the character described comprising, providing a plate consisting of two sheets pressure unified together about a pattern of stop-weld material delineating a series of spaced substantially parallel tube portions intervened by areas at which the sheets are unified, forming a series of spaced slits in said intervening areas, and spreading the slits by bending the tube portions at an angle to the plate to enlarge the open area thereof.

5. The method of making a heat exchange unit of the character described comprising, providing a plate consisting of two sheets pressure unified together about a pattern of stop-weld material delineating a series of spaced substantially parallel tube portions intervened by areas at which the sheets are unified, forming a series of spaced slits in said intervening areas, and bending the tube portions substantially at right angles to the plane of the plate.

6. The method of making a heat exchange unit of the character described comprising, providing a plate consisting of two sheets pressure unified together about a pattern of stop-weld material delineating a series of spaced substantially parallel tube portions intervened by areas at which the sheets are unified, forming a series of spaced slits in said intervening areas, twisting said tube portions into a plane substantially perpendicular to the plane of said plate, and bending said tube portions in a plane substantially parallel to said plate.

7. In a heat exchange core having a plurality of spaced generally parallel tubes and an interconnecting header all embraced within a plate composed of a pair of sheets pressure unified about a pattern of stop-weld material delineating the position of the tubes and interconnecting header, the improvement which comprises, said sheet being cut between the tubes and lengthwise thereof, and said sheet being zig-zag folded at the pressure unified areas which intervene the tubes and the tubes being sinuously bent.

8. In a heat exchange core having a plurality of spaced generally parallel tubes and an interconnecting header all embraced within a plate composed of a pair of sheets pressure unified about a pattern of stop-weld material delineating the position of the tubes and interconnecting header, the improvement which comprises, said sheet being cut between the tubes and lengthwise thereof, part of the tubes being twisted out of the plane of the plate and bent in the direction generally perpendicular to said plane while said header remains in the plane of the plate.

*9. A heat exchange unit comprising an expanded metal structure having staggered openings therein and strands surrounding each of the staggered openings and connected to each other at two sets of opposite points around the openings in the shape of a network with said structure having fluid passages extending through said network within said strands.*

*10. A heat exchange unit comprising an expanded metal structure having staggered openings therein and strands surrounding each of the staggered openings connected to each other at two sets of opposite points around the openings in the shape of a network, said structure having a fluid inlet and a fluid outlet and continuous fluid passages extending through said network within said strands from said inlet to said outlet.*

*11. A heat exchange unit comprising an expanded metal structure having staggered openings therein and strands extending across opposite ends and around each of the staggered openings in the shape of a network with said strands connecting at four points around intervening staggered openings to provide a continuous network connection of strands, said structure having an inlet and an outlet for heat exchange medium and fluid passages extending through said network within said strands continuously from said inlet to said outlet.*

*12. A heat transfer unit including an expanded metal structure having staggered openings therein and strands surrounding each of the staggered openings connecting to each other at two sets of opposite points around the openings in the shape of a network, said structure having continuous fluid passages throughout said network within said strands.*

References Cited in the file of this patent or the original patent

UNITED STATES PATENTS

| | | |
|---|---|---|
| 622,872 | Thornycraft | Apr. 11, 1899 |
| 822,996 | Smith | June 12, 1906 |
| 1,551,411 | Loewenstein | Aug. 25, 1925 |
| 2,268,885 | McCullough | Jan. 6, 1942 |
| 2,662,273 | Long | Dec. 15, 1953 |
| 2,690,002 | Grenell | Sept. 28, 1954 |
| 2,924,437 | Wilkins | Feb. 9, 1960 |
| 2,932,491 | Miller | Apr. 12, 1960 |